United States Patent
Corma Canos et al.

(10) Patent No.: US 6,797,254 B2
(45) Date of Patent: Sep. 28, 2004

(54) MICROPOROUS CRYSTALLINE MATERIAL (ITQ-15), METHOD FOR THE PREPARATION THEREOF AND ITS USE IN PROCESSES FOR SEPARATING AND TRANSFORMING ORGANIC COMPOUNDS

(75) Inventors: Avelino Corma Canos, Valencia (ES); Maria José Diaz Cabañas, Valencia (ES); Fernando Rey Garcia, Valencia (ES)

(73) Assignees: Consejo Superior de Investigaciones Cientificas, Madrid (ES); Universidad Politecnica de Valencia, Valencia (ES)

( * ) Notice: Subject to any disclaimer, the term of this patent is extended or adjusted under 35 U.S.C. 154(b) by 0 days.

(21) Appl. No.: 10/412,115

(22) Filed: Apr. 11, 2003

(65) Prior Publication Data

US 2003/0180217 A1 Sep. 25, 2003

Related U.S. Application Data

(63) Continuation of application No. PCT/ES01/00386, filed on Oct. 11, 2001.

(30) Foreign Application Priority Data

Oct. 11, 2000 (ES) .......................................... 200002521

(51) Int. Cl.$^7$ ............................................. C01B 39/48
(52) U.S. Cl. ..................... 423/706; 423/709; 423/718; 423/335; 208/46
(58) Field of Search ................................ 423/706, 709, 423/718, 335; 208/46

(56) References Cited

U.S. PATENT DOCUMENTS

| | | | |
|---|---|---|---|
| 4,880,611 A | * | 11/1989 | von Ballmoos et al. ..... 423/718 |
| 5,268,161 A | | 12/1993 | Nakagawa |
| 6,464,956 B1 | * | 10/2002 | Elomari ...................... 423/706 |

FOREIGN PATENT DOCUMENTS

| | | |
|---|---|---|
| WO | WO 91/11258 | 8/1991 |
| WO | WO 94/08899 | 4/1994 |
| WO | WO 00/37360 | 6/2000 |

OTHER PUBLICATIONS

Villaescusa, L A. et al., A New Pure Silica Polymorph with a Three–Dimensional System of Large Pore Channels; Angew. Chem Int. Ed. 1999, 28 No. 13/14, pp. 1997–2000.

* cited by examiner

*Primary Examiner*—David Sample
(74) *Attorney, Agent, or Firm*—Klauber & Jackson

(57) ABSTRACT

A microporous crystalline material of a zeolitic nature that, in a calcinated and anhydrous state, has a chemical composition represented by the formula:

$$x(M_{1/n}XO_2):yYO_2:zGeO_2:(1-z)TO_2$$

wherein x has a value below 0.2, y has a value below 0.1, z has a value below 1, with at least one of x, z and y being above zero; M is H+ or at least an inorganic cation with a +n charge; X is at least one chemical element with a +3 oxidation status; Y is at least one chemical element with a + oxidation status; and T is at least one chemical element with a +4 oxidation status (Si, Ti, Sn, V), this material having a specific X-ray diffraction pattern. A method for preparation of the material and its use as a catalyst in organic compound separation and transformation processes is also described.

19 Claims, 2 Drawing Sheets

MICROPOROUS CRYSTALLINE MATERIAL (ITQ-15), METHOD FOR THE PREPARATION THEREOF AND ITS USE IN PROCESSES FOR SEPARATING AND TRANSFORMING ORGANIC COMPOUNDS

This application is a continuation of international application number PCT ES01/00386, filed Oct. 11, 2001 (status, abandoned, pending, etc.).

TECHNICAL FIELD OF THE INVENTION

The present invention refers to microporous crystalline materials, particularly materials of a zeolitic nature, and specially materials of a zeolitic nature useful in the separation and transformation of organic compounds.

STATE OF THE ART BEFORE THE INVENTION

Zeolites are microporous crystalline materials formed by a crystalline network of tetrahedrons TO4 that share all their vertices leading to a three dimensional structure that contains channels and/or cavities of molecular dimensions. They are of a variable composition, and T generally represents atoms with a formal +3 or +4 oxidation status, such as, for example Si, Ge, Ti, Al, B, Ga, . . . If any of the T atoms has an oxidation status of less than +4, the crystalline network formed shows negative charges that are compensated by means of the presence of organic or inorganic cations in the channels and cavities. Organic molecules and H$_2$O can also be lodged in said channels and cavities, for which, in a general manner, the chemical composition of the zeolites can be represented by means of the following empirical formula:

$$x(M_{1/n}XO_2):yYO_2:zR:w\ H_2O$$

wherein M is one or various organic or inorganic cations with +n charge; X is one or various trivalent elements; Y is one or various tetravalent elements, generally Si; and R is one or various organic substances. Although by means of post-synthesis treatments the nature of M, X, Y and R and the values of x, y, z and w can be varied, the chemical composition of a zeolite (as synthesised or after its calcination) possesses a characteristic range for each zeolite and its method of being obtained.

On the other hand, the crystalline structure of each zeolite, with a specific system of channels and cavities, leads to a characteristic X-ray diffraction pattern. Therefore, the zeolites are differentiated among themselves through their range of chemical composition plus their X-ray diffraction pattern. The two characteristics (crystalline structure and chemical composition) also determine the physical and chemical properties of each zeolite and its possible application in different industrial processes.

DESCRIPTION OF THE INVENTION

The present invention refers to a microporous crystalline material of a zeolitic nature, (also identified as "ITQ-15"), to its method of preparation and its uses in processes for the separation and transformation of organic compounds.

This material is characterised by its X-ray diffraction pattern and by its chemical composition. In its anhydrous and calcinated form, the chemical composition of ITQ-15 can be represented by means of the empirical formula $$x(M_{1/n}XO_2):yYO_2:zGeO_2:(1-z)TO_2$$

wherein x has a value of less than 0.2;

y has a value of less than 0.1;

z has a value of less than 1, with at least one of x, z and y being greater than zero;

M is H+ or one or various inorganic cations with a +n charge;

X is at least one chemical element with a +3 oxidation status;

Y is one or various chemical elements with a + oxidation status; and

T is at least one chemical element with a +4 oxidation status;

The existence of defects in the crystalline network is possible, however, in terms of the method of synthesis and of its calcination or later treatments, which are shown by the presence of Si-OH groups (silanols). These defects have not been included in the above empirical formula.

The material of the invention is also characterised by its X-ray diffraction pattern as synthesised, obtained by the powder method using a slit of fixed divergence characterised by the following values of interplanar spacings (d) and relative intensities (I/I$_0$) of the most intense reflections.

TABLE I

| d(Å) ± 0.3 | I/I$_0$ |
|---|---|
| 14.01 | VS |
| 12.36 | VS |
| 9.15 | W |
| 4.94 | M |
| 3.92 | VS |
| 3.57 | M |
| 3.37 | VS |

On the other hand, the material according to the invention is also characterised because, in a calcinated and anhydrous state, it has the following X-ray diffraction pattern.

TABLE II

| d(Å) ± 0.3 | I/I$_0$ |
|---|---|
| 14.11 | VS |
| 12.42 | VS |
| 9.13 | M |
| 4.96 | W |
| 3.91 | M |
| 3.59 | W |
| 3.38 | M |

The positions, widths and relative intensities of some secondary peaks can depend to a certain extent on the chemical composition of the material. In this way, when the network of materials is composed exclusively of silicon and germanium oxide, with a Si/Ge=10 ratio and synthesised using a quaternary ammonium cation as a structure directing agent, the material, as it is synthesised has the ray diffraction pattern shown in table III.

TABLE III

| d(Å) ± 0.3 | I/I$_0$ |
|---|---|
| 14.01 | W |
| 12.36 | VS |
| 11.82 | M |
| 10.61 | W |
| 9.15 | W |

TABLE III-continued

| d(Å) ± 0.3 | I/I₀ |
|---|---|
| 7.75 | VW |
| 7.01 | W |
| 6.21 | W |
| 5.22 | VW |
| 4.94 | M |
| 4.56 | M |
| 4.33 | M |
| 4.15 | W |
| 3.97 | S |
| 3.92 | VS |
| 3.71 | W |
| 3.65 | W |
| 3.57 | M |
| 3.52 | W |
| 3.47 | M |
| 3.37 | VS |
| 3.25 | W |
| 3.11 | W |
| 3.09 | W |
| 3.06 | W |

On the other hand, table IV shows the values of interplanar spacings (d) and relative intensities of the most intense reflections of the powder X-ray diffractogram of the same sample of ITQ-15 whose values, after having been calcinated at 540° C. to eliminate the organic compounds occluded inside the zeolite, are as follows:

TABLE IV

| d(Å) ± 0.3 | I/I₀ |
|---|---|
| 14.11 | VS |
| 12.42 | VS |
| 11.81 | M |
| 10.56 | W |
| 9.13 | M |
| 8.15 | VW |
| 7.80 | VW |
| 7.10 | VW |
| 6.94 | W |
| 6.08 | VW |
| 5.94 | VW |
| 5.62 | W |
| 5.03 | VW |
| 4.96 | W |
| 4.58 | W |
| 4.33 | W |
| 4.16 | VW |
| 3.97 | M |
| 3.91 | M |
| 3.71 | W |
| 3.66 | W |
| 3.59 | W |
| 3.55 | W |
| 3.47 | W |
| 3.38 | M |
| 3.22 | VW |
| 3.08 | W |
| 3.05 | W |

In the previous tables, VW means very weak, W weak, M medium, S strong and VS very strong.

In a first embodiment of the material according to the invention, in the empirical formula identified above, T is Si, in such a way that the resulting empirical formula is:

$$x(M_{1/n}XO_2):yYO_2:zGeO_2:(1-z)SiO_2$$

wherein x has a value of less than 0.1, preferably less than 0.2, y has a value of less than 0.05 and preferably less than 0.02, z has a value of less than 0.1, M is H+ or one or various inorganic cations with a +n load, X is one or various chemical elements with a +3 oxidation status (preferably Al, Ga, B, Cr) and Y is one or various chemical elements with a +4 oxidation status (preferably Ti, Sn, V).

In a second embodiment of the material according to the invention, in the general empirical formula identified above, T is Si and y is zero, in such a way that the resulting empirical formula is $$x(M_{1/n}XO_2):zGeO_2:(1-z)SiO_2$$

wherein x has a value of less than 0.2, preferably less than 0.1 and more preferably less than 0.02, z has a value of less than 1 and more preferably less than 0.1; M is H+ or one or various inorganic cations with a +n charge and X is one or various chemical elements with a +3 oxidation status (preferably Al, Ga, B, Cr).

In a third embodiment of the material according to the invention, in the general empirical formula identified above, T is Si and y is zero, in such a way that the resulting empirical formula is $$yYO_2:z\, GeO_2:(1-z)SiO_2$$

wherein y has a value of less than 0.1, preferably less than 0.05 and more preferably less than 0.02, z has a value of less than 1, preferably less than 0.1 and Y is one or various chemical elements with a +4 oxidation status (preferably Ti, Sn or V).

In a fourth embodiment of the material according to the invention, in the general empirical formula identified above, T is Si and x is zero, in such a way that the resulting empirical formula is $$x(HXO_2):zGeO_2:(1-z)SiO_2$$

in which X is a trivalent element (preferably Al, Ga, B, Cr), x has a value of less than 0.2, preferably less than 0.1, and more preferably less than 0.02, z has a value of less than 1, and more preferably less than 0.1.

In a fifth embodiment of the material according to the invention, in the general empirical formula identified above, T is Si and x is zero, in such a way that the resulting empirical formula is $$zGeO_2:(1-z)SiO_2$$

wherein z has a value below 1 and preferably below 0.1.

In a sixth embodiment of the material according to the invention, in the general empirical formula identified above, z and y are zero, so that the resulting empirical formula is $$X(M_{1/n}XO_2):TO_2$$

wherein x has a value of less than 0.2; M is H+ or one or various inorganic cations with a +n charge; X is one or various chemical elements with a +3 oxidation (preferably Al, Ga, B, Cr) and T is one or various chemical elements with a +4 oxidation state (preferably Si, Ti, Sn, V).

This invention also refers to the method of preparation of ITQ-15. This includes thermal treatment at a temperature between 80 and 200° C., preferably between 130 and 200° C., of a reaction mixture that contains a source of $SiO_2$ (such as, for example, tetraethylorthosilicate, colloidal silica, amorphous silica), a source of $GeO_2$, an organic cation in the form of hydroxide, preferably di-hydroxide of 1,3,3-trimethyltricycle-6-azonium[3.2.1.4$^{6,6}$]dodecane and water. Alternately, it is possible to use the organic cation in the form of salt (for example, a halide, preferably chloride or bromide) and adding an alkali or alkali-earth source, preferably in the form of hydroxide. Cation I has two asymmetrical carbons and can be used as any of its two enantiomers, as a mixture of both or as a racemic mixture.

Optionally, it is possible to add a source of another or other tetravalent Y and/or trivalent X element(s), preferably Ti, V, Sn or Al, B, Ga, Fe. The adding of this or these element(s) can be performed before the heating of the reaction mixture or in an intermediate time during this heating. On occasions, it may also be convenient to include ITQ-15 crystals at some time during the preparation (between 0.01 and 15% by weight with regard to the group of inorganic oxides, preferably between 0.05 and 5% by weight) as promoters of the crystallisation (sowing). The composition of the reaction mixture responds to the general empirical formula $$rROH:aM_{1/n}OH:xX_2O_3:yYO_2:zGeO_2:(1-z)SiO_2:wH_2O$$

wherein M is H+ or one or various inorganic cations with a +n charge; X is one or various trivalent elements, preferably Al, B, Ga, Fe; Y is one or various tetravalent elements, preferably Ti, Sn, V; R is an organic cation, preferably 1,3,3-trimethyltricycle-6-azonium[3.2.1.4$^{6,6}$] dodecane; and the values of r, a, x, y, z, and w are in the following ranges:

- r=ROH/SiO$_2$=0.01–1.0, preferably between 0.1–1.0.
- a=M$_{1/n}$OH/SiO$_2$=0–1.0, preferably 0–0.2.
- x=X$_2$O$_3$/SiO$_2$=0–0.1, preferably between 0–0.05 and more preferably between 0–0.01.
- y=YO$_2$/SiO$_2$=0–0.1, preferably between 0–0.05 and more preferably between 0–0.02.
- z=GeO$_2$/(SiO$_2$+GeO$_2$) below 1, preferably less than 0.1.
- w=H$_2$O/SiO$_2$=0–100, preferably 1–50, more preferably between 1–15.

The thermal treatment of the reaction mixture can be executed statically or under stirring the mixture. Once the crystallisation has finished the solid product is separated and dried. Later calcination at temperatures between 400 and 650° C., preferably between 450 and 600° C., causes the decomposition of the organic remains occluded in the zeolite and the exit thereof, leaving the zeolitic channels free.

Once calcinated, the material therefore responds to the general formula

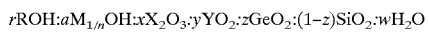

$$x(M_{1/n}XO_2):yYO_2:zGeO_2:(1-z)SiO_2$$

wherein x has a value below 0.2, preferably below 0.1, and more preferably below 0.02, with the possibility of being equal to zero; y has a value below 0.1, preferably below 0.05 and more preferably below 0.02, with the possibility of being equal to zero; z has a value below 1, preferably below 0.1; M is H+ or one or various inorganic cations with a +n charge; X is one or various chemical elements with a +3 oxidation status (preferably Al, Ga, B, Cr) and Y is one or various chemical elements with a +4 oxidation status (Ti, Sn, V).

The following applications are claimed for synthesised ITQ-15 zeolite in this description:

As an additive of hydrocarbon catalytic cracking catalysts, and in general, of organic compounds.

As a component of hydro-cracking and soft hydro-cracking catalysts.

As a component or additive of light paraffin isomerization catalysts.

As a component of de-paraffining and iso-paraffining catalysts.

As a catalyst of alkylation of isoparaffins with olefins and alkylation of aromatics and substituted aromatics with olefins and alcohols, and more specifically as a catalyst for the alkylation of benzene with propylene.

As a catalyst in acylation reactions of substituted aromatic compounds using acids, acid chlorides or organic acid anhydrides as acylating agents.

As catalysts in Meerwein-Pondorf-Verley and Oppenauer reactions.

In the case of the ITQ-15 containing Ti, it can be used as catalyst for the epoxidation of olefins, oxidation of alkanes, oxidation of alcohols and oxidation of thioethers to sulphoxides and sulphones using organic or inorganic hydroperoxide, as for example H$_2$O$_2$, tertbutylhydroperoxide, cumene hydroperoxide, as oxidating agents.

In the case of containing Sn, the ITQ-15 can be used as oxidating catalysts in Bayer-Villiger reactions using H2O2 as an oxidating agent. Finally, its use is described in ammoximation of cetones, and more specifically of cyclohexanone oxyme with NH$_3$ and H$_2$O.

BRIEF DESCRIPTION OF THE FIGURES

Some examples of the embodiment of the invention will be described below to contribute to an understanding of same, in which reference is made to figures that form an integral part of this description, and in which.

EXAMPLE 1

This example illustrates the preparation of dodecane 1,3,3-trimethyltricycle-6-azonium[3.2.1.4$^{6,6}$] hydroxide.

65.95 g of 1,4-di-bromobutane, 99% Aldrich with 15 g of NaOH dissolved in 270 g of water are mixed in a 500 ml balloon and the mixture is then left at reflux while being stirred. Afterwards, 47.62 g of 1,3,3,-tri-methyl-6-azabicyclo (3.2.1) octane is slowly added leaving an hour at reflux when ending the addition. The mixture is left to cool and 150 g of an aqueous solution of NaOH at 40% by weight is added. Chloroform is then added and the organic part is extracted, the process being repeated 3 times. The chloroform is then eliminated by concentrating in a vacuum in a steam rotary device and the resulting solid is washed with di-ethylic ether.

The nuclear magnetic resonance spectrum in D2O indicates that it is the product sought, that is to say, bromide of the 1,3,3,-tri-methyltricycle-6-azonium-[3.2.1.4$^{6,6}$] dodecane organic cation. The elemental analysis of the solid is the following: 4.63% N, 55.26% C, 8.53% H.

The hydroxide form of the structure directing agent is obtained by means of anionic exchange using a Dowex 1 (Sigma) resin previously washed with distilled water to pH=7. 150 g of resin are added to a solution of 42.08 g of the previous product in 90 g of water, leaving it being stirred for some 12 hours. After filtering the resin, the solution is valued with HCl (aq.), using phenolftaleine as an indicator, with an efficiency in the exchange of 94%. This solution can be concentrated in the steam rotary device for its use in synthesis of molecular screens, for example in 1N concentration.

EXAMPLE 2

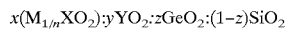

This example illustrates the preparation of ITQ-15 by means of the 1,3,3,-tri-methyltricycle-6-azonium-[3.2.1.4$^{6,6}$] dodecane cation.

0.20 g of germanium oxide is dissolved in 17.65 g of a solution of dodecane 1,3,3,-tri-methyltricycle-6-azonium-[3.2.1.4$^{6,6}$] hydroxide that contains 0.60 equivalent parts of hydroxide in 1000 g. With this solution, 4.20 g of tetraethylorthosilicate (TEOS) are added. This is left to evaporate while stirring, until complete elimination of the ethanol from the hydrolysis of the TEOS plus the quantity of water necessary for the final composition of the gel to be: 0.9 $SiO_2$:0.1 $GeO_2$:0.50 ROH:3 $H_2O$.

Figure 1:
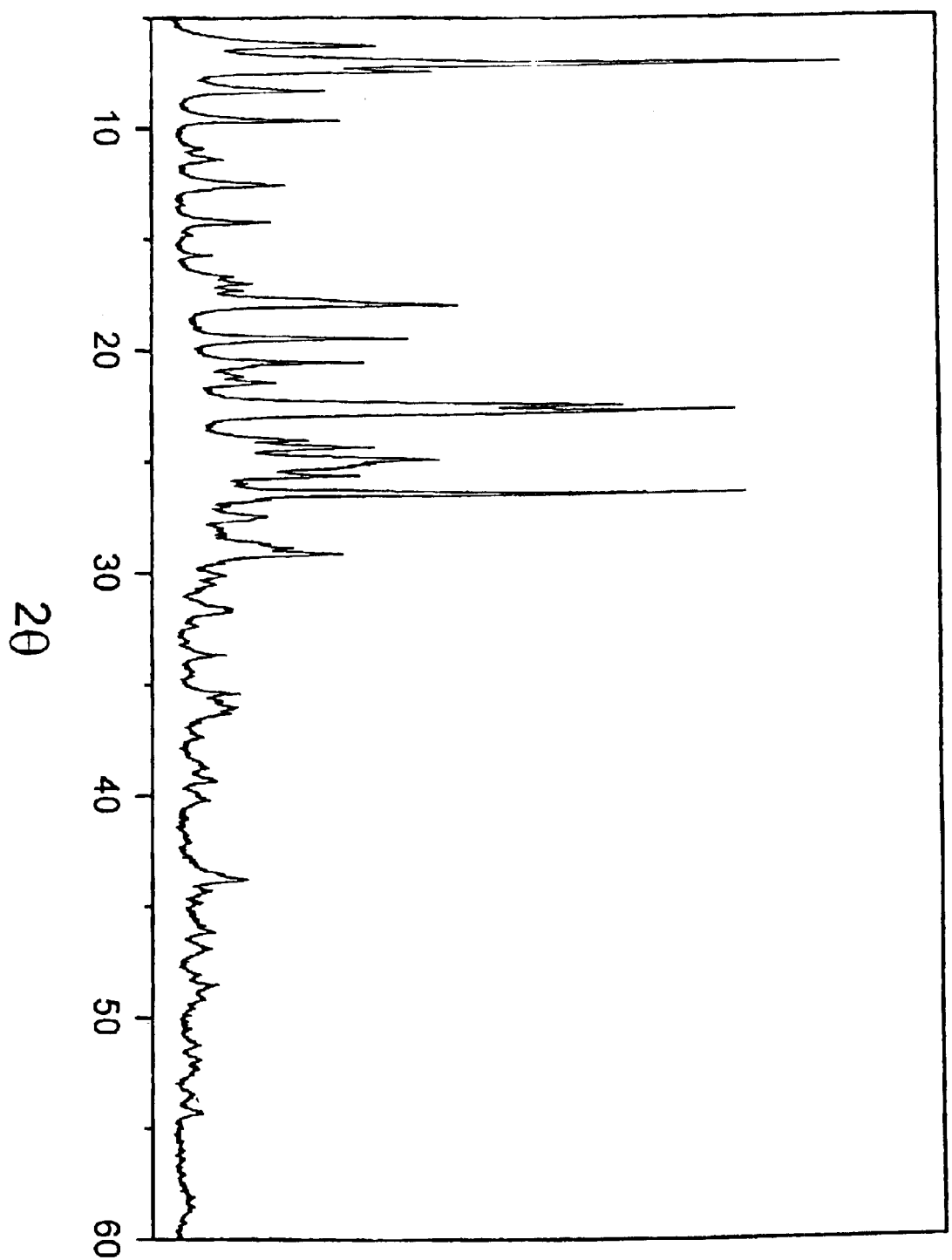
FIG. 1 is an X-ray diffraction pattern of the material as synthesised in example 2.
Figure 2:
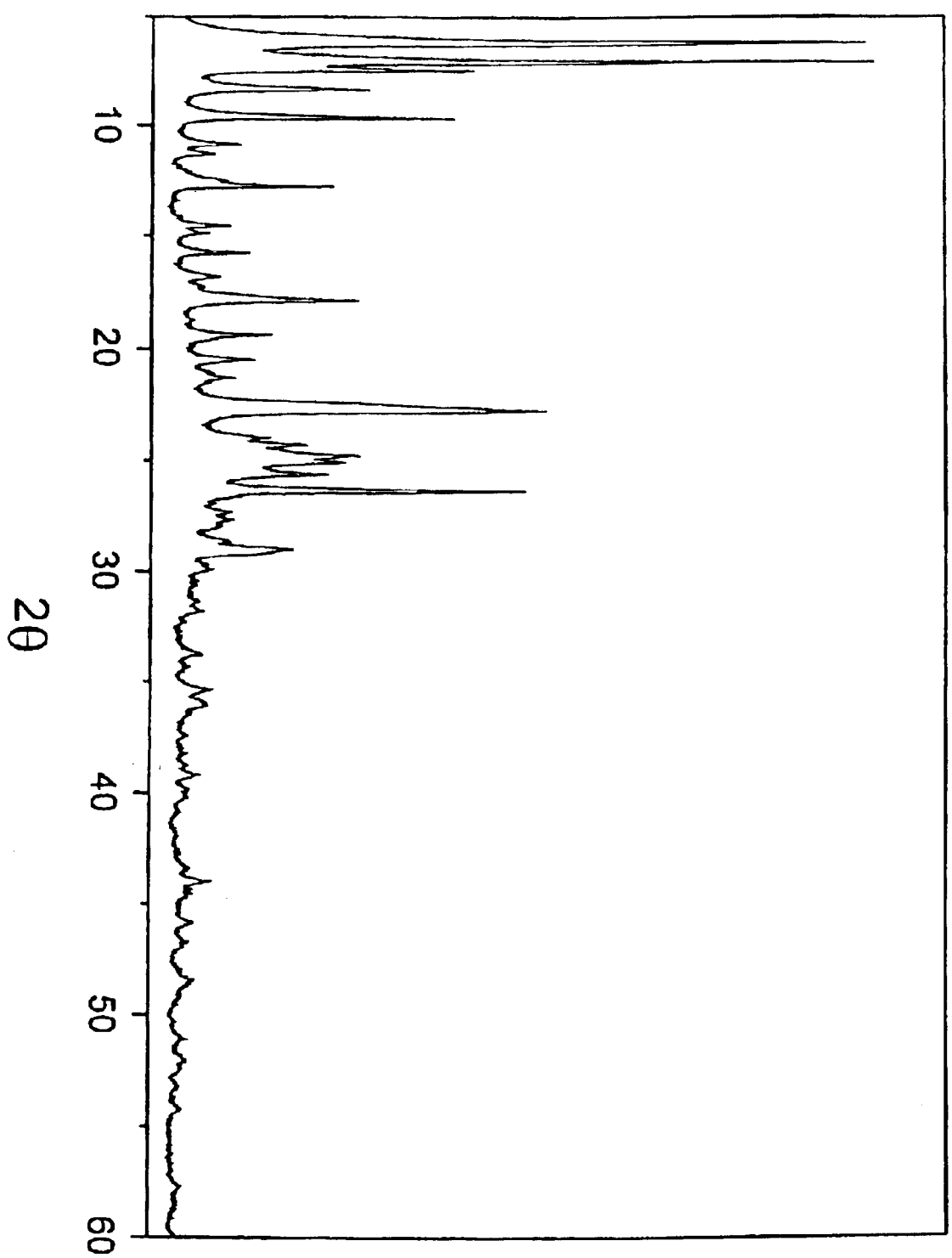
FIG. 2 is an X-ray diffraction pattern of the material of example 2 after calcination.

The mixture obtained is put into an autoclave provided with an internal lining of polytetrafluorethylene and is heated at 175° C. while the autoclave is kept rotating (60 rpm) for 18 days. Then, the autoclave is cooled, the content is filtered, the solid is washed with water and dried at 100° C. The X-ray diffraction pattern, shown in FIG. 1, indicates that the solid is pure ITQ-15 zeolite. Calcination at 540° C. in air for 3 hours allows for eliminating the occluded species, giving rise to the material whose diffractogram is shown in FIG. 2.

EXAMPLE 3

The following example shows how ITQ-15 with a different composition is obtained.

0.33 g of germanium oxide are dissolved in 32.28 g of a solution of dodecane 1,3,3,-tri-methyltricycle-6-azonium-[3.2.1.4$^{6,6}$] hydroxide with a concentration of 1.031 mols in 1000 g. Once dissolved, 13.21 g of tetraethylorthosilicate (TEOS) are hydrolysed, leaving the mixture to evaporate while stirring until the complete elimination of the ethanol formed and the excess water to reach the final composition indicated. The composition of the gel is: 0.95 g $SiO_2$:0.05 $GeO_2$:0.50 ROH:3 $H_2O$.

The mixture obtained is put into an autoclave provided with an internal lining of polytetrafluorethylene and is heated at 175° C. while the autoclave is kept rotating (60 rpm) for 35 days. The solid obtained after filtering, washing with distilled water and drying at 100° C. is ITQ-15 with a small amount of amorphous material.

EXAMPLE 4

This example illustrates the synthesis of B-ITQ-15.

0.06 g of boric acid and 0.48 g of germanium oxide are dissolved in 18.29 g of dodecane 1,3,3,-tri-methyltricycle-6-azonium-[3.2.1.4$^{6,6}$] hydroxide that contains 0.82 mols in 1000 g. 9.47 g tetraethylorthosilicate (TEOS) are added to this solution and left to evaporate while stirring, until the complete elimination of the ethanol formed in the TEOS hydrolysis plus the amount of water necessary to reach the final composition indicated. The composition of the gel is: 0.9 g $SiO_2$:0.1 $GeO_2$:0.01 $B_2O_3$:0.50 ROH:3 $H_2O$. The mixture obtained is put into an autoclave provided with an internal lining of polytetrafluorethylene and is heated at 175° C. while the autoclave is kept rotating (60 rpm) for 38 days.

The X-ray diffractogram of the solid obtained after filtering, washing with distilled water and drying at 100° C. indicates it is ITQ-15.

What is claimed is:

1. A microporous crystalline material of a zeolitic nature with a chemical composition in the calcinated and anhydrous state that can be represented by the empirical formula:

$$x(M_{1/n}XO_2):yYO_2:zGeO_2:(1-z)TO_2$$

wherein x has a value below 0.2;
y has a value below 0.1;
z has a value below 1;
being at least one of z, x and y above zero;
M is H+ or, at least, an inorganic cation with +n charge;
X is at least a chemical element in a +3 oxidation state;
Y is one or various chemical elements in a +4 oxidation state; and
T is at least a chemical element in a +4 oxidation state, where the material, in the as synthesised state, has an X-ray diffraction pattern with d(Å) interplanar spacing values and I/Io (%) relative intensities in agreement with

| d(Å) ± 0.2 | I/I$_0$ |
|---|---|
| 14.01 | W |
| 12.36 | VS |
| 9.15 | W |
| 4.94 | M |
| 3.92 | VS |
| 3.57 | M |
| 3.37 | VS | and where the calcinated and anhydrous material has an X-ray diffraction pattern with d(Å) interplanar spacing values and I/Io (%) relative intensities in agreement with:

| d(Å) ± 0.2 | I/I$_0$ |
|---|---|
| 14.11 | VS |
| 12.42 | VS |
| 9.13 | M |
| 4.96 | W |
| 3.91 | M |
| 3.59 | W |
| 3.38 | M | wherein W means weak, M medium and VS very strong.

2. A crystalline material according to claim 1, wherein
T is Si;
x has a value below 0.1;
y has a value below 0.05 and
z has a value below 0.1.

3. A crystalline material according to claim 1, wherein
T is Si;
x has a value below 0.2;
y is zero;
z has a value below 0.1

4. A crystalline material according to claim 1, wherein
T is Si;
y has a value below 0.1;
z has a value below 1.

5. A microporous crystalline material according to claim 1, wherein
M is H,
T is Si,
y is zero;
x has a value below 0.2, and
z has a value below 1.

6. A microporous crystalline material according to claim 1, wherein T is Si, x and y are zero, z has a value below 1.

7. A microporous crystalline material according to claim 1, wherein z and y are zero, and wherein T is selected from the group consisting of Si, Ti, Sn, V and combinations thereof.

8. A microporous crystalline material according to any of claim 1, wherein Y is selected from the group consisting of Ti, Sn, V and combinations thereof.

9. A microporous crystalline material according to any of claim 1, 2, 3 and 7, wherein X is selected from the group consisting of Al, Ga, B, Cr and combinations thereof.

10. A method for synthesising the microporous crystalline material in accordance with claim 1, in which one reaction mixture which contains a $SiO_2$ source,
an organic radical R in the form of a hydroxide, and water is subjected to heating at a temperature of between 80 and 200° C., until crystallisation has been achieved, in which the reaction mixture has a composition, in terms of molar ratios, within the following ranges $ROH/SiO_2=0.01–1.0$;
$M_{1/n}OH/SiO_2=0–1.0$;
$X_2O_3/SiO_2=0–0.1$;
$YO_2/SiO_2=0–0.1$;
$GeO_2/(SiO_2+GeO_2)$ less than 1,
$H_2O/SiO_2=0–100$;

wherein

M is H+ and at least one inorganic cation with +n charge;
X is at least one trivalent element,
Y is at least one tetravalent element,
R is an organic radical in the form of a hydroxide.

11. A method according to claim 10, wherein R is 1,3,3,-tri-methyltricycle-6-azonium-[3.2.1.4$^{6,6}$] dodecane organic cation.

12. A method according to claim 10, wherein a quantity of the crystalline material is added to the reaction mixture as a crystallisation promoter, said quantity being in the range of 0.01 to 15% by weight with respect to the total silica added.

13. A method according to claim 12, wherein the crystallisation promoter is a microporous crystalline material as defined in claim 1.

14. A method for use of a microporous crystalline material defined in claim 1, as a catalyst in a process selected from the group consisting of cracking, hydro-cracking, soft hydro-cracking of hydrocarbons and/or functionalised hydrocarbons, hydro-isomerisation of olefins, alkylation of olefins with iso-paraffins, alkylation of aromatics with olefins or alcohols, and alkylation of benzene with propylene.

15. A method for use of a microporous crystalline material defined in claim 1, as an oxidant in a selective oxidation process of organic compounds using oxidants selected from the group consisting of $H_2O_2$, organic peroxides or hydroperoxides.

16. A method for use of a microporous crystalline material, defined in claim 1, wherein Y is partially Sn, as a catalyst in a process of the Baeyer-Villiger type.

17. A method for use of a crystalline material, defined in claim 1, as a catalyst in an oxidation process of the Meerwein-Pondorf-Verley type.

18. A method for use of a microporous crystalline material defined in claim 1, wherein Y is partially Ti, as a catalyst in a process selected from the group consisting of processes from the epoxidation of olefins, oxidation of alkanes, oxidation of alcohols and oxidation of thioethers to sulphoxides and sulphones using organic or inorganic hydroperoxide, as oxidating agents.

19. A method according to claim 11, wherein the 1,3,3-tri-methyltricycle-6-azonium-[3.2.1.4$^{6,6}$] dodecane organic cation is added in the form of hydroxide or in the form of a mixture of hydroxide and another salt.

* * * * *